US008483887B2

(12) United States Patent
Ecton et al.

(10) Patent No.: US 8,483,887 B2
(45) **Date of Patent: *Jul. 9, 2013**

(54) REMOTE CONTROL SYSTEM HAVING A TOUCHSCREEN FOR CONTROLLING A RAILWAY VEHICLE

(75) Inventors: Mark Ecton, Edmond, OK (US); Torsten Rempe, Edmond, OK (US); Max Heckl, Oklahoma City, OK (US)

(73) Assignee: Hetronic International, Inc., Oklahoma City, OK (US)

( * ) Notice: Subject to any disclaimer, the term of this patent is extended or adjusted under 35 U.S.C. 154(b) by 21 days.

This patent is subject to a terminal disclaimer.

(21) Appl. No.: 13/165,506

(22) Filed: Jun. 21, 2011

(65) Prior Publication Data

US 2011/0251738 A1 Oct. 13, 2011

Related U.S. Application Data

(62) Division of application No. 12/056,827, filed on Mar. 27, 2008, now Pat. No. 8,295,992.

(51) Int. Cl.
*G05D 1/00* (2006.01)

(52) U.S. Cl.
USPC .................. 701/2; 246/5; 246/28 R; 246/121; 246/126; 246/182 C; 246/187 B; 701/93; 701/96; 701/213; 303/3; 303/19; 303/68; 303/159; 188/59; 188/181 R; 345/60; 345/626; 477/28; 92/17; 280/731; 340/426.11; 340/903; 342/70; 381/333; 180/65.2; 105/35; 105/72.2; 73/511

(58) Field of Classification Search
USPC . 246/5, 28 R, 121, 126, 182 C, 187 B; 701/2, 701/93, 96, 213; 303/3, 19, 68, 159; 188/59, 188/181 R; 345/60, 626; 477/28; 92/17; 280/731; 340/426.11, 903; 342/70; 381/333; 180/65.2; 105/35, 72.2; 73/511
See application file for complete search history.

(56) References Cited

U.S. PATENT DOCUMENTS

| | | | | | |
|---|---|---|---|---|---|
| 2,194,744 | A | * | 3/1940 | Farmer | 188/59 |
| 2,215,355 | A | * | 9/1940 | Hewitt | 477/28 |
| 2,249,965 | A | * | 7/1941 | Logan, Jr. | 303/3 |
| 2,490,998 | A | * | 12/1949 | Sexton | 303/68 |
| 3,457,403 | A | * | 7/1969 | Smith, Jr. | 246/187 B |
| 3,482,887 | A | * | 12/1969 | Sheppard | 303/159 |
| 3,655,962 | A | * | 4/1972 | Koch | 246/182 C |
| 3,777,858 | A | * | 12/1973 | Murphy | 188/181 R |
| 3,983,792 | A | * | 10/1976 | Furtner | 92/17 |
| 4,165,136 | A | * | 8/1979 | Erlbeck | 303/19 |
| 4,553,723 | A | | 11/1985 | Nichols et al. | |
| 4,582,280 | A | | 4/1986 | Nichols et al. | |
| 5,039,038 | A | | 8/1991 | Nichols et al. | |
| 5,129,605 | A | * | 7/1992 | Burns et al. | 246/5 |
| 5,511,749 | A | | 4/1996 | Horst et al. | |

(Continued)

*Primary Examiner* — James Trammell
*Assistant Examiner* — Sanjeev Malhotra
(74) *Attorney, Agent, or Firm* — Hall Estill Law Firm

(57) ABSTRACT

The present invention is directed to a remote control system for controlling a railway vehicle. The remote control system including a remote control device for transmitting signals to a first controller module. The first controller is mounted to the railway vehicle and controls and monitors the functions of the railway vehicle. The first controller module also relays information to the remote control device. The remote control system can also include a portable safety switch allowing any individual in proximity to the railway vehicle to send a stop signal to the first controller module to stop the railway vehicle if any unsafe conditions exist.

13 Claims, 5 Drawing Sheets

U.S. PATENT DOCUMENTS

| | | | | |
|---|---|---|---|---|
| 5,685,507 | A | 11/1997 | Horst et al. | |
| 5,823,481 | A * | 10/1998 | Gottschlich | 246/28 R |
| 5,867,122 | A | 2/1999 | Zahm et al. | |
| 6,314,345 | B1 | 11/2001 | Coombes | |
| 6,421,587 | B2 | 7/2002 | Diana et al. | |
| 6,449,536 | B1 | 9/2002 | Brousseau et al. | |
| 6,456,674 | B1 | 9/2002 | Horst et al. | |
| 6,456,937 | B1 | 9/2002 | Doner et al. | |
| 6,470,245 | B1 | 10/2002 | Proulx | |
| 6,490,523 | B2 | 12/2002 | Doner | |
| 6,505,103 | B1 | 1/2003 | Howell et al. | |
| 6,603,485 | B2 | 8/2003 | Forman | |
| 6,658,331 | B2 | 12/2003 | Horst et al. | |
| 6,691,005 | B2 | 2/2004 | Proulx | |
| 6,697,716 | B2 | 2/2004 | Horst | |
| 6,759,951 | B2 | 7/2004 | Kellner et al. | |
| 6,789,004 | B2 | 9/2004 | Brousseau et al. | |
| 6,799,098 | B2 | 9/2004 | Horst et al. | |
| 6,834,219 | B2 | 12/2004 | Proulx | |
| 6,837,466 | B2 | 1/2005 | Peltz | |
| 6,853,890 | B1 | 2/2005 | Horst et al. | |
| 6,854,691 | B2 | 2/2005 | Kraeling et al. | |
| 6,863,247 | B2 | 3/2005 | Horst | |
| 6,928,342 | B2 | 8/2005 | Horst | |
| 6,937,925 | B2 | 8/2005 | Smith | |
| 6,975,927 | B2 | 12/2005 | Szklar et al. | |
| RE39,011 | E | 3/2006 | Horst et al. | |
| 7,038,597 | B2 | 5/2006 | Smith | |
| 7,069,122 | B1 | 6/2006 | Higgs | |
| RE39,210 | E | 8/2006 | Horst et al. | |
| 7,120,428 | B2 | 10/2006 | Higgs | |
| 7,126,985 | B2 | 10/2006 | Horst et al. | |
| 7,164,709 | B2 | 1/2007 | Horst et al. | |
| 7,167,510 | B2 | 1/2007 | Horst et al. | |
| 7,203,228 | B2 | 4/2007 | Horst et al. | |
| 7,233,844 | B2 | 6/2007 | Peltz et al. | |
| RE39,758 | E | 8/2007 | Horst et al. | |
| 7,369,672 | B2 | 5/2008 | Hirschhorn | |
| 7,725,252 | B2 | 5/2010 | Heddebaut | |
| 2002/0154141 | A1 * | 10/2002 | Forman | 345/626 |
| 2003/0235320 | A1 * | 12/2003 | Hirschhorn | 381/333 |
| 2005/0211479 | A1 * | 9/2005 | Tamor | 180/65.2 |
| 2006/0005738 | A1 * | 1/2006 | Kumar | 105/35 |
| 2006/0050018 | A1 * | 3/2006 | Hutzel et al. | 345/60 |
| 2006/0065050 | A1 * | 3/2006 | Saito et al. | 73/511 |
| 2006/0151672 | A1 * | 7/2006 | Heddebaut et al. | 246/121 |
| 2006/0187006 | A1 * | 8/2006 | Quintos | 340/426.11 |
| 2007/0028798 | A1 * | 2/2007 | Langenbeck | 105/72.2 |
| 2007/0093951 | A1 * | 4/2007 | Schroeder et al. | 701/96 |
| 2007/0168125 | A1 * | 7/2007 | Petrik | 701/213 |
| 2008/0027590 | A1 * | 1/2008 | Phillips et al. | 701/2 |
| 2008/0169966 | A1 * | 7/2008 | Tsuchihashi et al. | 342/70 |
| 2008/0291052 | A1 * | 11/2008 | Burns | 340/903 |
| 2009/0189373 | A1 * | 7/2009 | Schramm et al. | 280/731 |
| 2011/0130939 | A1 * | 6/2011 | Hartmann et al. | 701/93 |
| 2011/0133038 | A1 * | 6/2011 | Kiss et al. | 246/126 |

* cited by examiner

REMOTE CONTROL SYSTEM HAVING A TOUCHSCREEN FOR CONTROLLING A RAILWAY VEHICLE

CROSS-REFERENCE TO RELATED APPLICATIONS

This application is a division of U.S. Ser. No. 12/056,827, filed on Mar. 27, 2008, now U.S. Pat. No. 8,295,992 the contents are hereby incorporated by reference in its entirety.

STATEMENT REGARDING FEDERALLY SPONSORED RESEARCH OR DEVELOPMENT

Not applicable.

BACKGROUND OF THE INVENTION

1. Field of the Invention

The present invention relates generally to a remote control system for transmitting signals to a railway vehicle. More particularly, the present invention relates to a remote control system provided with an LCD touchscreen for monitoring and providing commands to the railway vehicle. Additionally, the present invention relates to a remote control system provided with a plurality of safety switches. The remote control system is particularly suitable for use in switching (or rail) yard applications.

2. Description of the Related Art

Remote control systems for controlling locomotives are known in the art. Typically, remote control systems for locomotives have two main components, namely a remote control device and a locomotive controller module. The remote control device is generally a portable unit that is carried by a human operator located at a certain distance from the locomotive. The remote control device is operative for sending command signals to the locomotive controller module. The locomotive controller module is typically mounted on board the locomotive and is adapted for receiving command signals sent by the remote control device over a wireless communication link.

When an operator would like to cause a movement of the locomotive in a certain direction, or at a certain speed, for example, the operator manipulates the controls on the remote control device in order to specify the desired parameters (i.e., forward, backwards, speed, etc. . . . ). The parameters are encoded into a command signal, which is then sent by the remote control device to the locomotive control device. The locomotive control device processes the command signal and issues local control signals to a control interface for causing the desired commands to be implemented by the locomotive.

A deficiency with existing remote control systems is that there is only one remote control device, which limits the number of emergency stop signals or stop signals transmitted by existing remote control systems. Another limitation of existing remote control systems is the lack of information provided to the operator.

Accordingly, there is a need in the industry to provide a remote control system that alleviates the deficiencies associated with the existing remote control systems.

SUMMARY OF THE INVENTION

The present invention relates to a remote control system for controlling a railway vehicle. The railway vehicle has a throttle for providing tractive power to the railway vehicle to propel the railway vehicle and a brake system for providing braking power to the railway vehicle. The remote control system includes a remote control device for transmitting signals. The remote control device has a large video display to display real time information of the railway vehicle. The remote control system further provides a first controller module connected to the railway vehicle and in communication with the remote control device. The first controller module monitors a set of predetermined functions of the railway vehicle and receives commands from the remote control device to control the set of predetermined functions of the railway vehicle. The first controller module provides the real time information to the remote control device.

In a further embodiment, the present invention is directed toward a remote control system for controlling a railway vehicle. The railway vehicle has a throttle for providing tractive power to the railway vehicle to propel the railway vehicle and a brake system for providing braking power to the railway vehicle. The remote control system includes a remote control device for transmitting signals. The remote control system further provides a first controller module connected to the railway vehicle and in communication with the remote control device. The first controller module receives commands from the remote control device to control predetermined functions of the railway vehicle. The first controller module provides the real time information to the remote control device. Additionally, the remote control system is provided with at least one portable safety switch in communication with the first controller module to provide a stop signal to the first controller module to stop the railway vehicle.

In another embodiment, the present invention is directed toward a remote control system for maintaining a specific velocity of a railway vehicle. The remote control system includes a remote control device for transmitting signals. The remote control system further includes a first controller module connected to the railway vehicle and in communication with the remote control device. The first controller module transmits a signal to a throttle to propel the railway vehicle in a predetermined direction. The remote control system includes a GPS device in communication with the first controller module to determine the position and velocity of the railway vehicle. The position and velocity of the railway vehicle is transmitted to the remote control device via the first controller module. The remote control device transmits a signal to the first controller module to maintain the velocity of the railway vehicle at a specific velocity once the specific velocity is reached by the railway vehicle as determined by the GPS device.

In another embodiment, the present invention is directed toward a remote control system for a railway vehicle. The railway vehicle has a throttle for providing tractive power to the railway vehicle to propel the railway vehicle and a brake system for providing braking power to the railway vehicle. The remote control system includes a remote control device for transmitting a drive command signal to the railway vehicle to move the railway vehicle in a first direction of travel. The remote control device is operated by a user. The remote control system is further provided with a first controller module connected to the railway vehicle and in communication with the remote control device. The first controller module receives the drive command signal and relays the drive command signal to the throttle to provide the tractive power to the railway vehicle. The remote control system is provided with a GPS unit in communication with the first controller module to provide an initial velocity and an initial direction of travel of the railway vehicle to the first controller module. The first controller module transmits the initial velocity and an initial direction of travel of the railway vehicle to the remote control device thereby initiating a warning signal that the railway vehicle is in motion. The warning signal functions for a predetermined amount of time before initiating a fault condition. The fault condition causes an application of the brake system to stop the railway vehicle.

DETAILED DESCRIPTION OF THE INVENTION

Figure 1:
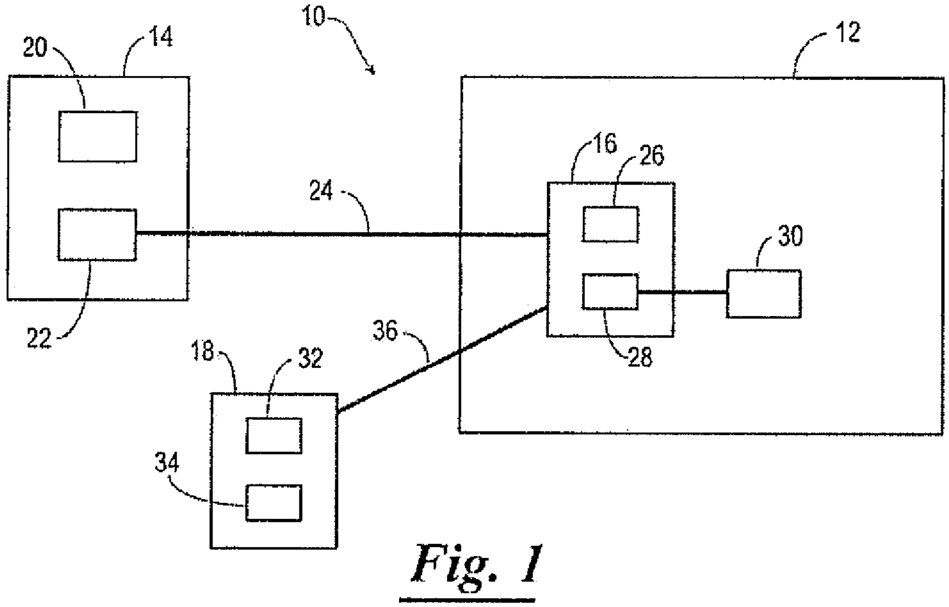
FIG. 1 shows a block diagram of a remote control system constructed in accordance with the present invention.

The present invention relates to a remote control system 10 for controlling a railway vehicle 12. Examples of railway vehicles include, but are not limited to, locomotives and railcar spotters. Referring now to the drawings, and more particular to FIG. 1, shown therein is the remote control system 10 constructed in accordance with the present invention. In one embodiment of the present invention, the remote control system 10 includes a remote control device 14 and a first controller module 16 that is adapted for being mounted on board the railway vehicle 12. In one embodiment of the present invention, the remote control system 10 further includes a portable safety switch 18 for sending a stop signal to first controller module 16 to stop the railway vehicle 12.

The remote control device 14 includes an input 20 for receiving command signals from a user that are indicative of commands to be executed by the railway vehicle 12. The command signals can convey useful commands including, but not limited to, speed commands, braking commands, direction commands, throttle commands, coast commands, and the like. The remote control device 14 further includes a processing unit 22 that is in communication with input 20 for receiving the commands signals. The processing unit 22 transmits signals conveying the commands to be executed by the railway vehicle 12 to the first controller module 16 via a wireless communication link 24. The wireless communication link 24 can be any suitable communication link capable of transmitting the desirable information from the remote control device 14 to the first controller module 16, such as radio frequency, microwave communication, infrared communication, satellite links, and the like.

In a specific embodiment of the present invention, the remote control device 14 is a portable unit that can be carried by operator located remotely from the railway vehicle 12. However, in an alternative embodiment, the remote control device 14 is a fixed device that is mounted at a remote location from the railway vehicle 12, such as in a control tower or in an operator station.

The first controller module 16 is suitable for being mounted on board the railway vehicle 12. The first controller module 16 includes an input 26 for receiving signals sent from the remote control device 14 over the wireless communication link 24. The first controller module 16 further includes a processing module 28 for generating local control signals on the basis of the signals sent from the remote control device 14. As will be described in more detail further on in the description, when the command signals are sent from the remote control device 14 to the first controller module 16 for specific command signals, the processing module 28 is able to issue the local control signals to a control interface 30 for causing the railway vehicle 12 to execute the commands conveyed by the signal sent by the remote control device 14.

For the purposes of the present description, the term "control interface 30" refers globally to the collection of various actuators located on the train for executing various local control signals issued by the first controller module 16. Examples of such actuators include the actuators that control the throttle and the brakes, among others.

The portable safety switch 18 includes a stop switch 32 for executing the stop signal, and an all clear switch 34. The portable safety switch 18 is in communication with the first controller module 16 whereby execution of the stop switch 32 transmits the stop signal from the portable safety switch 18 to the first controller module 16 via a wireless communication link 36. It should be understood and appreciated that the wireless communication link 36 operates in a similar manner to the wireless communication link 24 described herein. The portable safety switch 18 can be carried by any individual within proximity of the remote control of the railway vehicle 12 who determines if any unsafe conditions are present and, if any unsafe conditions are present, the individual within proximity of the remote control of the railway vehicle 12 can initiate the stop signal by executing the stop switch 32 of the portable safety switch 18. The all clear switch 34 of the portable safety switch 18 can be executed by the individual within proximity of the remote control of the railway vehicle 12 to notify the user of the remote control device 14 that it is safe to again control the railway vehicle 12 with the remote control device 14. Executing the stop switch 32 of the portable safety switch 18 by the individual within proximity of the remote control of the railway vehicle 12 transmits a signal to the first controller module 16 to immediately stop the railway vehicle 12. It should be understood and appreciated that while only one portable safety switch 18 is included in FIG. 1, the remote control system 10 of the present invention can include any number of portable safety switches 18 desirable to safely monitor the railway vehicle 12 by the remote control device 14. The stop signal is sent to the first controller module 16 to provide the appropriate command signals to the railway vehicle 12 and to provide notification to the remote control device 14 that the stop signal has been transmitted from the portable safety switch 18 to the first controller module 16. It should be understood and appreciated that the stop signal initiated by the portable safety switch 18 and transmitted to the first controller module 16 can be any type of signal such that the railway vehicle 12 is brought to a stop, such as an emergency stop or an ordinary stop of a railway vehicle understood by those of ordinary skill in the art.

Figure 2:
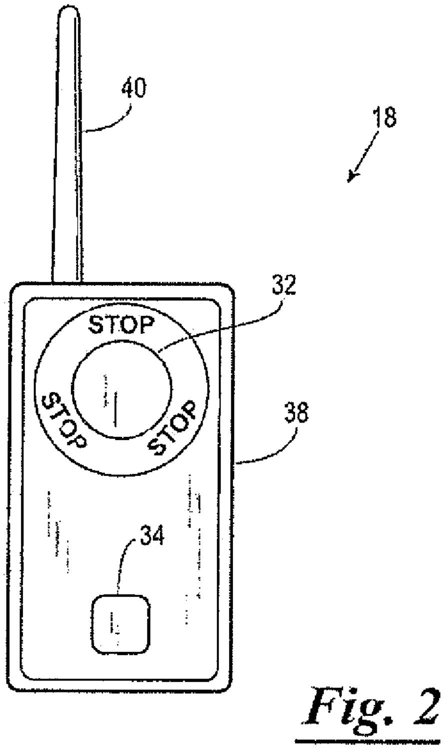
FIG. 2 shows a block diagram of another embodiment of the remote control system constructed in accordance with the present invention.

Shown in FIG. 2 is a specific implementation of the portable safety switch 18. In addition to the stop switch 32 and the all clear switch 34, the portable safety switch 18 includes a housing 38 and an antenna 40 connected to the housing 38. While FIG. 2 shows a specific implementation of the portable safety switch 18, it should be understood and appreciated that the portable safety switch 18 can be implemented in any manner such that it has a stop switch 32 and an all clear switch 34 whereby the stop signal can be transmitted to the first controller module 16 to stop the railway vehicle 12.

Figure 3:
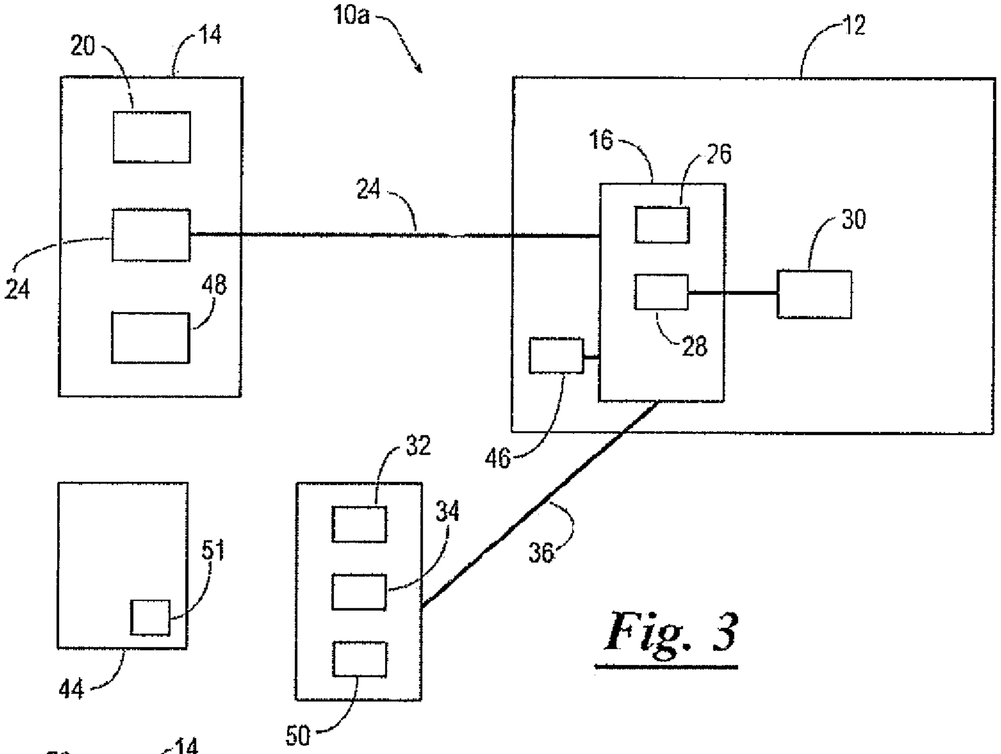
FIG. 3 shows a specific, non-limiting example of a physical embodiment of a portable safety switch constructed in accordance with the present invention.

Referring now to FIG. 3, shown therein is another embodiment of the remote control system depicted by reference numeral 10*a*. The remote control system 10*a* includes the railway vehicle 12, the remote control device 14, the first controller module 16, and the portable safety switch 18 described herein for the remote control system 10. The remote control system 10*a* further includes a command center 44 to monitor the railway vehicle 12, the remote control device 14, the first controller module 16, and the portable safety switch 18. The railway vehicle 12 of the remote control system 10*a* is further provided with a GPS device 46 to provide the location of the railway vehicle 12 to the remote control device 14 and thus, the user of the remote control device 14. The GPS device 46 is mounted to the railway vehicle 12 and is in communication with the first controller module 16, which transmits the location of the railway vehicle 12 to the remote control device 14 via wireless communication link 24. It should be understood and appreciated that the GPS device 46 can communicate with the first controller module 16 via any method known in the art suitable for maintaining communication, such as a wireless communication link or a hardwire communication link. In another embodiment of the present invention, the remote control device 14 of the remote control system 10*a* includes a GPS device 48 to provide the location of the remote control device 14 and/or the user of the remote control device 14. In a further embodiment of the present invention, the portable safety switch 18 of the remote control system 10*a* includes a GPS device 50 to provide the location of the portable safety switch 18 and/or the location of the individual monitoring the railway vehicle 12 and transporting the portable safety switch 18. In another embodiment of the present invention, the command center 44 is provided with a GPS device 51 to provide the remote control system 10*a* with a reference point thereby providing more reliable positioning of the remote control device 14, the portable safety switch 18, and the railway vehicle 12 via their respective GPS devices 48, 50, and 46. It should be understood and appreciated that the GPS devices 46, 48, 50, and 51 can communicate via any suitable manner known in the art for global positioning systems, such as via satellites of the U.S. Global Positioning System, the Global Navigation Satellite System (Galileo), and the Global Navigation Satellite System (Russian GLONASS).

The command center 44 of the remote control system 10*a* monitors and tracks the locations of the portable safety switch 18, the remote control device 14, and the railway vehicle 12 via their respective GPS devices 50, 48, and 46. The command center 44 is capable of retaining and displaying various types of information related to the remote control of a railway vehicle 12. This information can be received from the remote control device 14, the first controller module 16, and/or the portable safety switch 18. Examples of information that the command center 44 is capable of retaining and displaying include, but are not limited to, man down alarm identifying the location, railway vehicle maintain speed, desired locomotive speed, actual locomotive speed, main tank reservoir pressure, train brake status, train brake pressure, independent brake status, independent brake pressure, locomotive electrical amperage reading, first controller module location, portable safety switch locations, commands, plain language diagnostics, and the like. The command center 44 will also be capable of controlling a warning device in the case of an alarm condition. The typical warning device would be a bell, horn, light, or any combination thereof.

Figure 4:
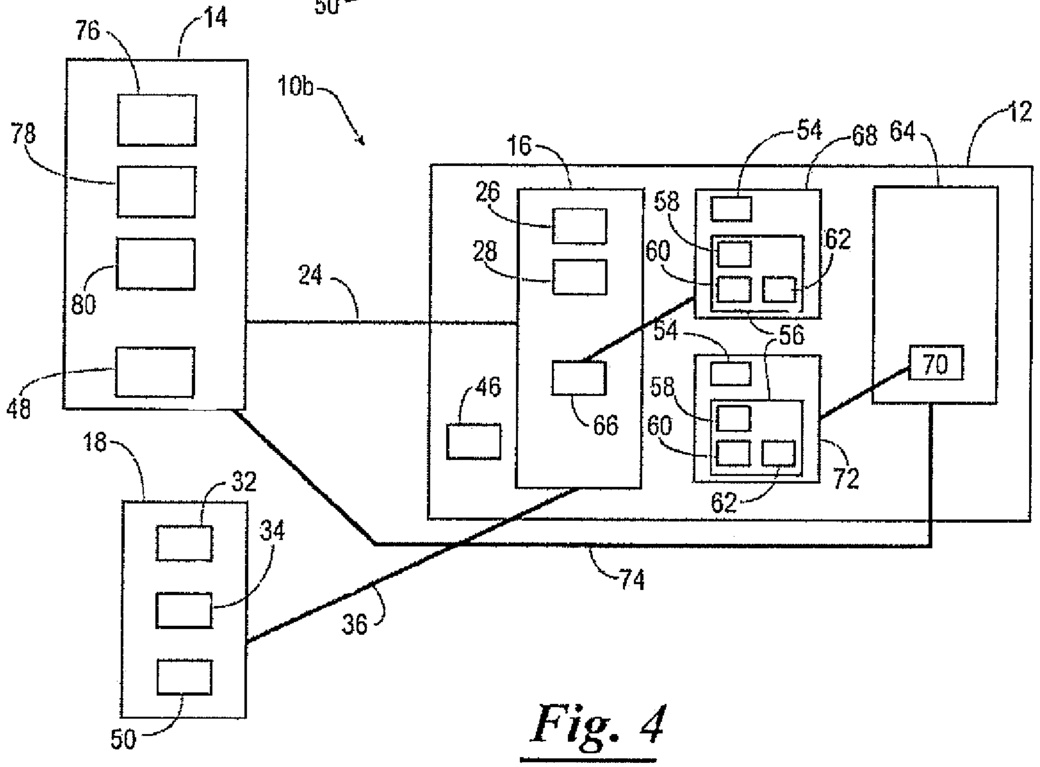
FIG. 4 shows a block diagram of a further embodiment of the remote control system constructed in accordance with the present invention.

Referring now to FIG. 4, shown therein is another embodiment of the remote control system in accordance with the present invention and depicted by reference numeral 10*b*. The remote control system 10*b* includes the railway vehicle 12, the remote control device 14, the first controller module 16, and the portable safety switch 18 described herein for the remote control system 10. In this embodiment, the railway vehicle 12 is provided with a throttle 54 for providing tractive power to the railway vehicle 12 to propel the railway vehicle 12 and a brake system 56 for providing braking power to the railway vehicle 12. The braking system 56 includes an independent brake 58 containing a pressurized fluid having a measurable pressure, a train brake 60 containing a fluid having a measurable pressure, and a main reservoir 62 containing a fluid for providing fluid pressure to the independent brake 58 and the train brake 60 and also having a measurable pressure. It should be understood and appreciated that any railway vehicle 12 described herein can be equipped with the throttle 54, the braking system 56, the independent brake 58, the train brake 60, the main reservoir 62, or any combination thereof. It should also be understood and appreciated that fluid, as used herein, can be any liquid or gas capable of being pressurized or unpressurized to stop the railway vehicle 12, such as air or water.

In the embodiment of the present invention shown in FIG. 4, the remote control system 10*b* is further provided with a second controller module 64 mounted to the railway vehicle 12 in a similar manner to the first controller module 16. In this embodiment, the first controller module 16 is provided with a first sensor 66 to monitor a first set of predetermined functions 68 of the railway vehicle 12 and the second controller module 64 provided with a second sensor 70 to monitor a second set of predetermined functions 72 of the railway vehicle 12. The first controller module 16 mounted on the railway vehicle 12 monitors the first set of predetermined functions 68 of the railway vehicle 12 to ensure safe operability of railway vehicle 12. The second controller module 64 monitors the second set of predetermined functions 72 of the railway vehicle 12 to further ensure safe operability of the railway vehicle 12. The second controller module 64 mounted to the railway vehicle 12 operates in a similar fashion to the first controller module 16 of the railway vehicle 12. For example, the second controller module 64 mounted to the railway vehicle 12 communicates with the remote control device 14 via a separate wireless communication link 74. It should be understood and appreciated that the wireless communication link 74 operates in a similar manner to the wireless communication link 24 described herein.

The first set of predetermined functions 68 and the second set of predetermined functions 72 of the railway vehicle 12 can be any functions of the railway vehicle 12 that are necessary in controlling the railway vehicle 12. Examples of predetermined functions of the first and second set of predetermined functions 68 and 72 include, but are not limited to, pressure of the main reservoir 62 of the railway vehicle 12, the pressure of the independent brake 58 of the railway vehicle 12, the pressure in the train brake 60 of the railway vehicle 12, the throttle 54 of the railway vehicle 12, and the like. It should be understood and appreciated that the predetermined functions of the first and second set of predetermined functions 68 and 72 of the railway vehicle 12 can be any functions known by one of ordinary skill in the art for operating and controlling the railway vehicle 12.

In a specific embodiment of the present of invention, the first sensor 66 of the first controller module 16 monitors the pressure of a fluid contained in the main tank reservoir 62 and provides an output from the first sensor 66 that is transmitted to the remote control device 14. Similarly, the second sensor 70 of the second controller module 64 monitors the pressure of the fluid contained in the independent brake 58 and provides an output from the second sensor 70 of the second controller module 64 to the remote control device 14 indicative of the pressure of the fluid contained in the independent brake 58. The throttle 54 of the railway vehicle 12 cannot be initiated, thus providing tractive power to the railway vehicle 12, until the pressure of the fluid contained in the main tank reservoir 62 is above a predetermined main tank reservoir level and the pressure of the fluid contained in the independent brake 58 is below a predetermined independent brake level.

In one embodiment of the present invention, if pressure in the main reservoir 62 falls below 90 p.s.i. (6.2 bar), a main reservoir warning will illuminate and the buzzer will sound. The first controller module 16 will initially disallow the operation if the pressure of the main reservoir 62 is below 90 p.s.i. (6.2 bar). During operation, should the pressure of the main reservoir 62 fall below 90 p.s.i. (6.2 bar), a visual and audible warning will be initiated automatically by the first controller module 16 and transmitted to the remote control device 14. Should the condition continue for more than 10 seconds, the first controller module 16 will throttle down and stop the locomotive with the application of the braking system 56.

If pressure of the fluid in the train brake 60 is less than 85 p.s.i. (5.86 bar), a train brake 60 indicator will illuminate. The first controller module 16 and/or second controller module 64 will initially disallow operation of the railway vehicle 12 if the pressure of the fluid in the train brake 60 pressure is less than 85 p.s.i. (5.86 bar). However, should the pressure of the fluid in the train brake 60 drop below 45 p.s.i. (3.1 bar), the first controller module 16 and/or second controller module 64 will throttle down the railway vehicle 12 and stop the railway vehicle 12 with the braking system 56.

An independent brake indicator illuminates whenever the pressure of the fluid in the independent brake 58 has more than 5 p.s.i. (0.34 bar) of pressure to indicate the possibility that the braking system 56 may be dragging.

In another embodiment of the present invention shown in FIG. 4, the remote control device 14 of the remote control system 10*b* is further provided with a tilt recognition device 76 to provide a warning signal to the remote control device 14 when the remote control device 14 is tilted a predetermined amount from a substantially level position, a vibration detection device 78 to provide a warning signal to the remote control device 14 when the remote control device 14 is vibrated (or shaken) a predetermined amount from a substantially stable position, an impact detection device 80 to provide a warning signal to the remote control device 14 when the remote control device 14 is impacted above a predetermined impact level, and any combination thereof of the tilt recognition device 76, the vibration detective device 78, and the impact detection device 80. The tilt recognition device 76 provides the warning signal to the remote control device 14 for a predetermined amount of time before the remote control system 10*b* enters into a fault condition. When the remote control system 10 enters into the fault condition, a stop signal is sent to the first controller module 16 so as to initiate the safe stoppage of the railway vehicle 12. The potential fault condition generated by the tilt recognition device 76 can be avoided by a cancellation of the warning signal by a user of the remote control device 14 or repositioning the remote control device 14 in the substantially level position. In one embodiment of the present invention, once the remote control device 14 is tilted beyond the substantially level position for more than at least two seconds, the warning signal will be provided to the remote control device 14 for at least four seconds before the remote control system 10*b* enters into the fault condition.

Similar to the tilt recognition device 76, the vibration detection device 78 provides the warning signal for a predetermined amount time before the remote control system 10*b* enters into the fault condition. Additionally, the fault condition generated by the vibration detection device 78 can be avoided by a cancellation of the warning signal by a user of the remote control device 14 or repositioning the remote control device 14 in the substantially stable condition. In one embodiment of the present invention, once the remote control device 14 is vibrated (or shaken) beyond the substantially stable position for more than at least two seconds, the warning signal will be provided to the remote control device 14 for at least four seconds before the remote control system 10*b* enters into the fault condition.

In addition to providing the remote control system 10*b* with a warning signal when the remote control device 14 is impacted above a predetermined impact level, the impact detection device 80 further provides a second warning signal to the remote control device 14 when the remote control device 14 is impacted above a second predetermined level. Once the remote control device 14 is impacted above the second predetermined impact level, the second warning signal is provided to the remote control device 14 for a predetermined amount of time before the remote control system 10*b* enters into the fault condition. The fault condition can be avoided by a cancellation of the warning signal by a user of the remote control device 14. It should be understood and appreciated that the warning signals for the tilt recognition device 76, the vibration detection device 78, and the impact detection device 80 can be any signal providing notice to the user of the remote control device 14, such as an audio warning or a visual warning.

In another embodiment of the present invention, the remote control system 10*b* is sent into a fault condition if communication between the remote control device 14 and the first controller module 16 (and the second controller module 64 if one is implemented) is lost for a predetermined amount of time. In one embodiment, the remote control system 10*b* is sent into a fault condition when communication between the remote control device 14 and the first controller module 16 (and the second controller module 64 if one is implemented) is lost for a period of time greater than about five seconds.

If the remote control system 10*b* enters into the fault condition and control of the railway vehicle 12 is severed then various procedures may have to be performed before control of the railway vehicle can be restored to the user of the remote control device 14. Some of the procedures used to recover control of the railway vehicle 12 can be performed at the remote control device 14 while other procedures must be performed at the first controller module 16 and/or the railway vehicle 12. Further information on fault conditions and recovery of the railway vehicle 12 from the same can be found in EN50239 (Railway applications. Radio remote control system of traction vehicle for freight traffic).

Figure 5:
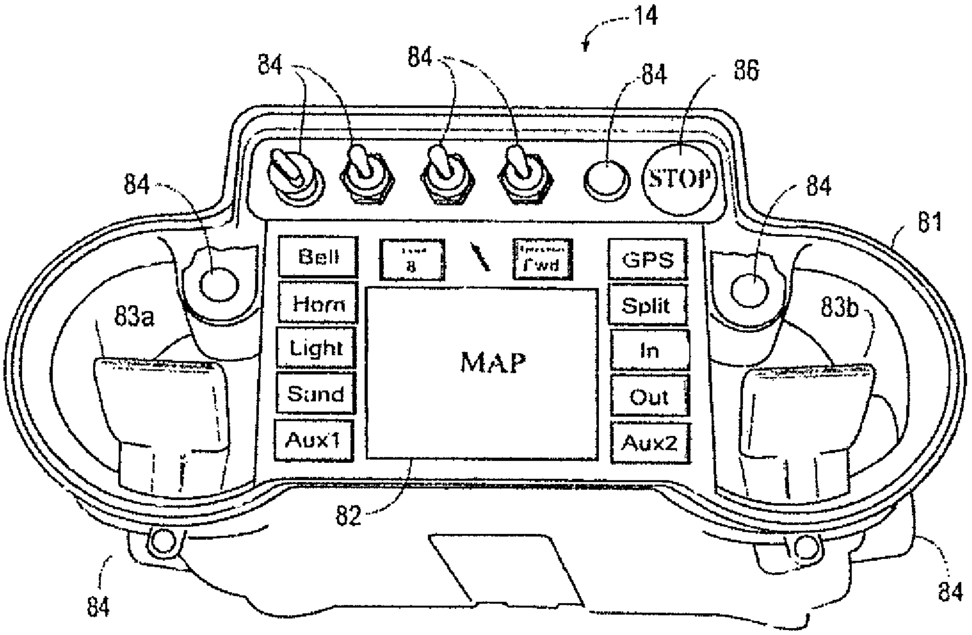
FIG. 5 shows a specific, non-limiting example of a physical embodiment of a remote control device constructed in accordance with the present invention.

In one embodiment of the present invention, the remote control device 14 is a portable remote control device 14 that is adapted for being carried by a human operator located at a certain distance from the railway vehicle 12. A specific, non-limiting, example of a physical layout of the remote control device 14 is shown in FIG. 5. Remote control device 14 shown in FIG. 5 is in the form of portable unit that includes a housing 81 for enclosing the electronic circuitry, a battery for supplying electrical power (not shown) and a large video display 82 to display real time information of the railway vehicle 12 provided via the first controller module 16. The large video display 82 can be any type of display capable of displaying the real time information provided to the remote control device 14 from the first controller module 16. Examples include, but are not limited to, a cathode ray tube, a bistable display, an electronic paper, an electrophoretic display, a nixie tube display, an electroluminescent display, a plasma display panel, a light-emitting diode, a liquid crystal display, a vacuum fluorescent display, a high performance addressing display, a thin-film transistor display, an organic light-emitting diode display, a surface-conduction electron-emitter display, a laser tv display, a carbon nanotube display, and a nanocrystal display. The large video display can also be any size such that the real time information is viewable by the user of the remote control device, In one embodiment of the present invention, the large video display 82 has a diagonal length greater than about 2.5". In another embodiment of the present invention, the large video display 82 has a diagonal length greater than about 3.5". In a further embodiment of the present invention, the large video display 82 has a diagonal length greater than about 5". In another embodiment of the present invention, the large video display 82 has a diagonal length greater than about 7".

In any embodiment described herein, the large video display 82 can be provided with a touchscreen, which provides executable command options to the user for conveying commands from the remote control device 14 to the first controller module 16 to be implemented by the railway vehicle 12. The large video display 82 can be provided with any type of screen capable of functioning as a touchscreen. Examples include, but are not limited to, a resistive touchscreen, an infrared touchscreen, a surface acoustic wave touchscreen, a capacitive touchscreen, a strain gauge touchscreen, an optical imaging touchscreen, a dispersive signal touchscreen, an acoustic pulse recognition touchscreen, and a frustrated total internal reflection touchscreen. The large video display 82 can also be provided with backlighting to improve visibility of the information displayed on the large video display 82.

In addition to the large video display 82, the remote control device 14 is provided with levers such as 83*a* and 83*b* located on either side of the large video display 82, that are able to be manipulated by a user in order enter command signals. Specifically, by manipulating lever 83*a* located on the left side of large video display 82, the user is able to apply the train brake 60 of the railway vehicle 12. Similar to the control lever 83*a*, the control lever 83*b* is located on the right side of the large video display 82 whereby the user is able to control the independent brake 58 and the throttle 54 of the railway vehicle 12. It should be understood and appreciated that the remote control device 14 can be provided with any number of levers to thereby provide any function to the railway vehicle 12 described herein. The remote control device 14 is further provided with a plurality of control devices 84 for controlling various other commands of the remote control device 14. The control devices 84 can be any knob, button, lever, toggle switch, and the like known in the art for initiating a signal and/or command. Examples of other commands and/or signals include, but are not limited to, on/off commands, bell/horn activation, a reverser switch, a Reset Safety Circuit (RSC) switch, and the like. The remote control device 14 is also provided with an emergency stop feature to provide an emergency stop switch 86 to the first controller module 16 to quickly and safely bring the railway vehicle 12 to a complete stop. The emergency stop switch 86 of the remote control device 14 can be any type of switch capable of being initiated by the user of the remote control device 14, such as a button, toggle switch, or the like.

The remote control system 10, and thus the remote control device 14, is provided with a plurality of frequencies at which the remote control system 10 and the remote control device 14 is operable. In one embodiment of the present invention, the remote control system 10 can operate at two different frequencies selected from the plurality of frequencies at which the remote control system 10 is operable. For example, a railway yard where the remote control system 10 is being implemented may have a license to use a specific frequency and can only use that frequency within a specific proximity of the railway yard. Once the railway vehicle 12 is outside of that given area or railway yard, a separate frequency must be used. The present invention can be set up such that the remote control system 10 can operate at the specific frequency for which the railway yard is licensed and seamlessly operate at a separate frequency outside of that given area for the railway yard. The two different frequencies can be selected manually by anyone implementing the remote control system 10 in accordance with the present invention. In another embodiment of the present invention, the remote control system 10 is able to automatically select frequencies from the plurality of frequencies that the remote control system 10 is operable by its location, which is given by the GPS device 46 of the railway vehicle 12 and the GPS device 48 of the remote control device 14. Examples of frequencies used include, but are not limited to, frequencies in the ranges of 419-480 MHz, 865.6-867.6 MHz, 902-928 MHz, 952-954 MHz, 2.4-2.6 GHz, and the combinations thereof. It should be understood and appreciated that the remote control system 10 and the remote control device 14 can be set up to operate at any frequency suitable for carrying the signals necessary to operate the remote control system 10.

Figure 6A:
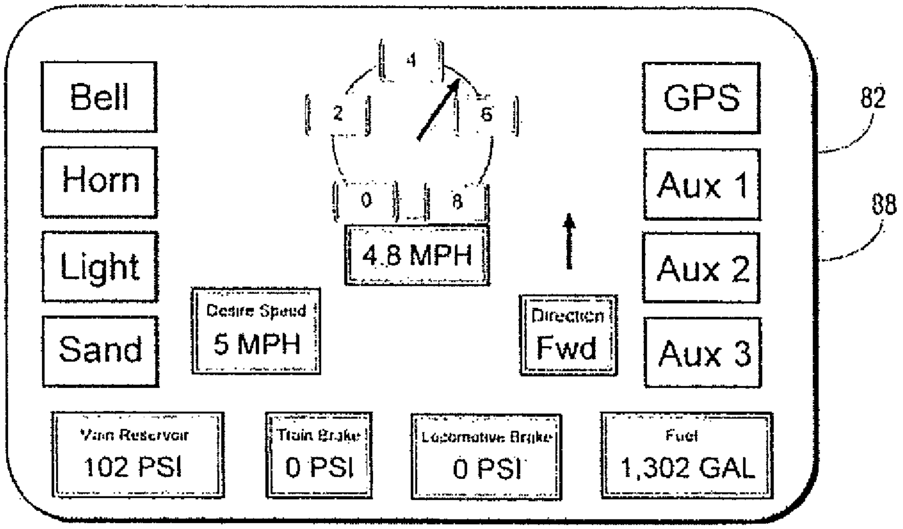
FIG. 6A shows a specific, non-limiting example of a touchscreen view of the remote control device constructed in accordance with the present invention.
Figure 6B:
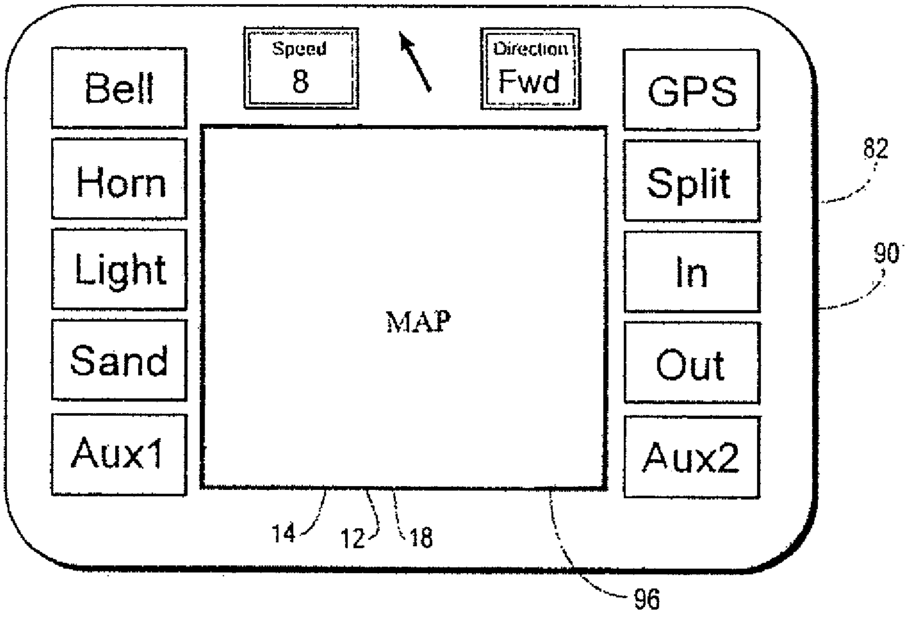
FIG. 6B shows a specific, non-limiting example of another touchscreen view of the remote control device constructed in accordance with the present invention.
Figure 6C:
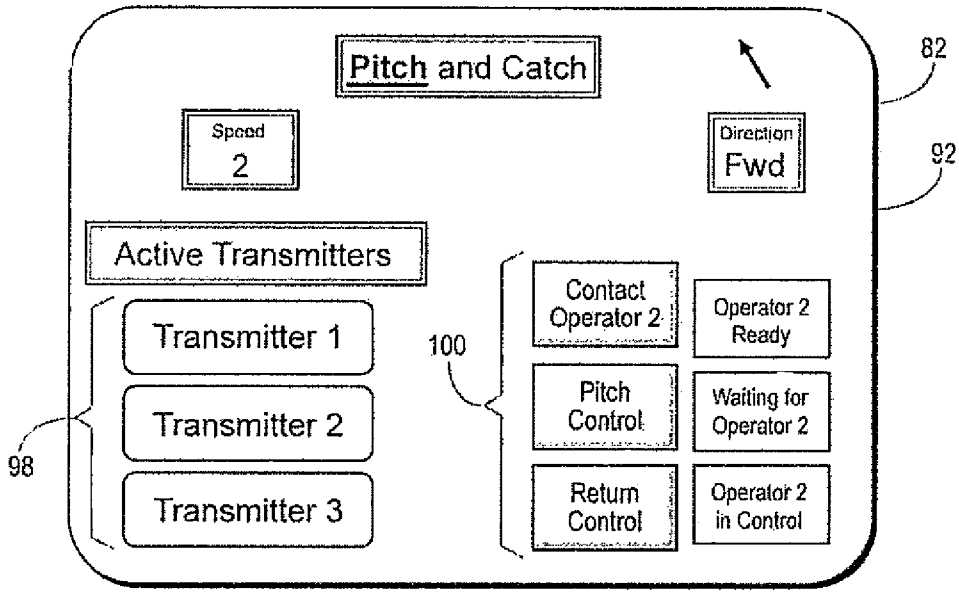
FIG. 6C shows a specific, non-limiting example of a further touchscreen view of the remote control device constructed in accordance with the present invention.
Figure 6D:
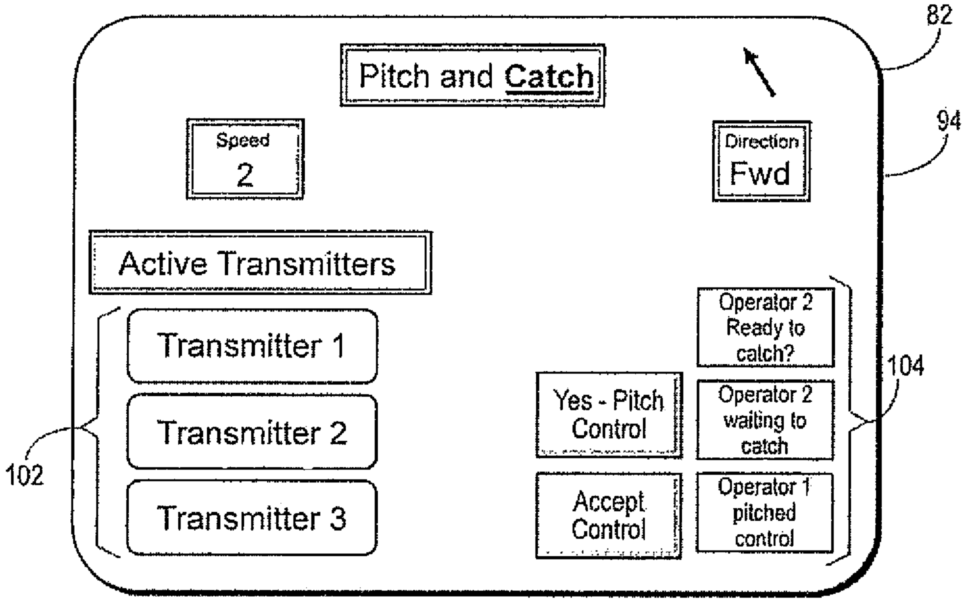
FIG. 6D shows a specific, non-limiting example of a final touchscreen view of the remote control device constructed in accordance with the present invention.

As shown in FIGS. 6A-6D, the large video display 82 of the remote control device 14 is provided with a plurality of various screen options. FIG. 6A shows a motion control screen 88, FIG. 6B shows a GPS screen 90, FIG. 6C shows a pitch screen 92, and FIG. 6D shows a catch screen 94. The motion control screen 88 can be provided with any information necessary for the user of the remote control device 14 to monitor the movement (or motion) of the railway vehicle 12 and control the operations of the railway vehicle 12. Examples of information provided to the motion control screen 88 of the remote control device 14 include, but are not limited to, direction information, speed information, main reservoir pressure, train brake pressure, locomotive brake pressure, amount of fuel for the railway vehicle 12, and the like. The motion control screen 88 is also provided with executable touch screen features, such as bell, horn, GPS for switching the large video display 82 to the GPS screen 90, a light switch, and the like. It should be understood and appreciated that the motion control screen 88 can be provided with any number of executable touch screen buttons so as to be able to safely and efficiently monitor and control the movement and functions of the railway vehicle 12.

The GPS screen 90 of the remote control device 14 displays a map 96 of the area where the remote control system 10 is being implemented. The map 96 of the GPS screen 90 shows the locations of the railway vehicle, 12 the user of the remote control device 14, and any portable safety switches 18 that are used in any given embodiment of the present invention. The railway vehicle 12, the remote control device 14, and the portable safety switch 18 are shown on the screen via the GPS device 46 of the railway vehicle 12 and the GPS devices 48 and 50 of the remote control device 14 and the portable safety switch 18, respectively. The GPS screen 90 is further provided with a plurality of executable touchscreen buttons to control any desirable functions of the railway vehicle 12 by the user of the remote control device 14. The GPS screen 90 also displays the speed and direction of travel of the railway vehicle 12.

The pitch screen 92 and the catch screen 94 of FIGS. 6C and 6D are used to complete a pitch and catch of the remote control of the railway vehicle 12. The speed and direction of travel of the railway vehicle 12 are both displayed on the pitch screen 92 and the catch screen 94. The pitch screen 92 is displayed on the remote control device 14 of the user who is currently in control of the railway vehicle 12. Conversely, the catch screen 94 is displayed on a separate remote control device 14, which is controlled by another user awaiting to take control of the railway vehicle 12. The pitch screen 92 is provided with a list of active remote control devices 98 capable of taking control of the railway vehicle 12 and a set of pitch functions 100 available to the user of the remote control device 14 to pitch control of the railway vehicle 12 to another user of another remote control device 14. The list of active remote control devices 98 and the set of pitch functions 100 on the pitch screen 92 are executable touchscreen buttons capable of being initiated by the user of the remote control device 14 by pressing the button on the large video display 82. The catch screen 94 is provided with a second list of active remote control devices 102 capable of pitching control of the railway vehicle 12 and a set of catch functions 104 for providing executable options to the user of the remote control device 14 who is "catching" control of the railway vehicle 12.

In use, the pitch screen 92 and the catch screen 94 are coordinated for transferring the remote control of a railway vehicle 12. A first remote control device 14 having remote control of the railway vehicle 12 is selected. The first remote control device 14 provided with the large video display 46 wherein the pitch screen 92 has been selected, thereby providing the list of active remote control devices 98 for which the transfer of remote control of the railway vehicle 12 can be made. Then a second remote control device 14 is selected from the list of available remote control devices 98 to which the transfer of the railway vehicle 12 is desired. Once the second remote control device 14 is selected, a transfer request is transmitted from the first remote control device 14 having command authority of the railway vehicle 12 to the first controller module 16 (or the second controller module 64) mounted on the railway vehicle 12. After the transfer request is transmitted, an acceptance of the transfer request from the second remote control device 14 is transmitted via the first controller module 16 to the first remote control device 14. Finally, a confirmation of transfer is transmitted from the first remote control device 14 to the second remote control device 14 wherein the second remote control device 14 assumes the command authority from the first remote control device 14. Once the confirmation of transfer is submitted, the second remote control device 14 generates a second command authority signal, which is received by the first controller module 16 of the railway vehicle 12.

In one embodiment of the present invention, the remote control system 10 is used to maintain a desired velocity of the railway vehicle 12. The user of the remote control device 14 transmits a signal to the first controller module 16 so as to provide tractive power to the railway vehicle 12 to propel the railway vehicle 12 in a predetermined direction. The GPS device 46 mounted to the railway vehicle 12 determines the position and velocity of the railway vehicle 12 after the railway vehicle 12 has begun moving. The user of the remote control device 14 monitors the velocity of the railway vehicle 12 until the velocity of the railway vehicle 12 reaches a desired velocity. Once the railway vehicle 12 reaches the specific velocity desired by the user of the remote control device 14 as determined by the GPS device 46 mounted to the railway vehicle 12 and transmitted to the remote control device 14, the user of the remote control device 14 executes a cruise command at the remote control device 14 so as to hold the railway vehicle 12 at the desired speed at which the cruise command was executed. The cruise command can be any type of actionable switch or button on the remote control device 14 or the large video display 82 of the remote control device 14.

The present invention is also directed towards methods of controlling the railway vehicle 12 using the remote control system 10. In one embodiment, the remote control device 14 is provided and the remote control device 14 includes the large video display 82 to display real time information of the railway vehicle 12 and provide command options for the railway vehicle 12. Also provided is the first controller module 16 connected to the railway vehicle 12 and in communication with the remote control device 14. The remote control device 14 transmits a command signal from the remote control device 14 to the first controller module 16. The command signal transmitted from the remote control device 14 is received by the first controller module 16 to control the first set of predetermined functions 68 of the railway vehicle 12. The first set of predetermined functions 68 of the railway vehicle 12 are monitored by the remote control device 14 via the first controller module 16. Finally, the remote control device 14 is provided with the real time information from the first controller module 16, which is displayed the large video display 82 of the remote control device 14.

In another embodiment of the present invention, a method for maintaining a specific velocity is provided. the remote control device 14 is provided for transmitting signals to control the railway vehicle 12. The first controller module 16, connected to the railway vehicle 12, is provided in communication with the remote control device 14. Also provided is the portable safety switch 18, which is in communication with the first controller module 16 to provide a stop signal to the first controller module 16 to stop the railway vehicle 12. Once the remote control device 14, the first controller module 16, and the portable safety switch 18 are provided, a command signal is transmitted from the remote control device 14 to the first controller module 16 to control the first set of predetermined functions 68 of the railway vehicle 12. Finally, the first set of predetermined functions 68 of the railway vehicle 12 are monitored via the first controller module 16.

In another embodiment of the present invention, a method for maintaining a specific velocity of a railway vehicle is provided. The remote control device 14 is provided for transmitting signals to control the railway vehicle 12. The method further provides the first controller module 16, which is connected to the railway vehicle 12, in communication with the remote control device 14. The method also provides the GPS device 46, which is attached to the railway vehicle 12, in communication with the first controller module 16 to determine the position and velocity of the railway vehicle 12. Once the remote control device 14, the first controller module 16, and the GPS device 46 are provided, a signal from the remote control device 14 is transmitted to the throttle 54 via the first controller module 16 to propel the railway vehicle 12 in a predetermined direction. After the railway vehicle 12 has been propelled, the position and velocity of the railway vehicle 12 as determined by the GPS device 46 is transmitted to the remote control device 14 via the first controller module 16. Finally, a signal is transmitted from the remote control device 14 to the first controller module 16 to maintain the velocity of the railway vehicle 12 at a specific velocity once the specific velocity is reached by the railway vehicle 12 as determined by the GPS device 46.

In a further embodiment of the present invention, the remote control device 14 can further be provided with a removable program button. The removable program button can store all of the programming and setup for the remote control device 14 for any predetermined operational parameters of the remote control system 10. The removable program button can be removed from a first remote control device 14 and provided to a second remote control device 14 wherein the second remote control device 14 is provided with the programming and setup for the predetermined operational parameters for the remote control system 10.

It should be understood and appreciated that the remote control system 10, the remote control device 14, and the controller modules 16 and 64 can be programmed to operate in any desirable manner by the individual or entity wanting to implement any embodiment of the remote control system 10 described herein using various setup interfaces, such as H-Link, USB Port, and/or the large video display 82. It should also be understood and appreciated that the remote control system 10, the remote control device 14, and the controller modules 16 and 64 can be setup and designed so as to meet any of the operational standards defined in EN 50125-1 (Railway applications. Environmental conditions for equipment. Equipment on board rolling stock), EN 50126 (Railway applications. The specification and demonstration of reliability, availability, maintainability and safety (RAMS)), EN 50128 (Railway applications. Communications, signaling and processing systems. Software for railway control and protection systems), EN 50129 (Railway applications. Communication, signaling and processing systems. Safety related electronic systems for signaling), EN 50159-1 (Railway applications. Communication, signaling and processing systems. Safety related communication in closed transmission systems), EN 50159-2 (Railway applications. Communication, signaling and processing systems. Safety related communication in open transmission systems), EN 50239 (Railway applications. Radio remote control system of traction vehicle for freight traffic), EN 60870-5-1 (Telecontrol equipment and systems. Transmission protocols. Transmission frame formats), EN 61508 (Functional safety of electrical/electronic/programmable electronic safety-related systems), and EN 50325-4 (Industrial communication subsystem based on ISO 11898 (CAN) for controller-device interfaces. CANopen).

From the above description, it is clear that the present invention is well adapted to carry out the objects and to attain the advantages mentioned herein as well as those inherent in the invention. While presently preferred embodiments of the invention have been described for purposes of this disclosure, it will be understood that numerous changes may be made which will readily suggest themselves to those skilled in the art and which are accomplished within the spirit of the invention disclosed and claimed.

What is claimed is:

1. A remote control system for controlling a railway vehicle, the railway vehicle having a throttle for providing tractive power to the railway vehicle to propel the railway vehicle and a brake system for providing braking power to the railway vehicle, the remote control system comprising:

a remote control device for transmitting signals, the remote control device having a video display to display real time information of the railway vehicle, the video display having a touchscreen the touchscreen providing executable command options for the railway vehicle;

a first controller module connected to the railway vehicle and in communication with the remote control device, the first controller module monitoring a set of predetermined functions of the railway vehicle and receiving commands from the remote control device to control the set of predetermined functions of the railway vehicle, the first controller module providing the real time information to the remote control device;

a tilt recognition device to provide a warning signal to the remote control device when the remote control device is tilted a predetermined amount from a substantially level position;

the tilt recognition device provides the warning signal for a predetermined amount of time before the remote control system enters into a fault condition; the fault condition avoidable by a cancellation of the warning signal by a user of the remote control device or repositioning the remote control device in the substantially level position; and the warning signal provided to the remote control device comprises an audio warning or a visual warning.

2. The remote control system of claim 1 wherein the video display has a diagonal length that is greater than about 2.5 inches.

3. The remote control system of claim 1 wherein the large video display has a diagonal length that is greater than about 5 inches.

4. The remote control system of claim 1 wherein the touchscreen is selected from the group consisting of a resistive touchscreen, an infrared touchscreen, a surface acoustic wave touchscreen, a capacitive touchscreen, a strain gauge touchscreen, an optical imaging touchscreen, a dispersive signal touchscreen, an acoustic pulse recognition touchscreen, and a frustrated total internal reflection touchscreen.

5. The remote control system of claim 1 wherein the video display is provided with backlighting to improve visibility of the displayed information.

6. The remote control system of claim 1 wherein the information displayed on the video display can be changed by an operator of the remote control device so as to provide a different set of information and command options actionable via the touchscreen.

7. The remote control system of claim 1 wherein the remote control system is provided with a plurality of frequencies at which the remote control system is operable.

8. The remote control system of claim 7 wherein the remote control system operates at two different frequencies selected from the plurality of frequencies at which the remote control system is operable, the two different frequencies are manually selected by the user of the remote control system or automatically by the remote control system based upon permitted frequencies in a preselected area.

9. The remote control system of claim 1 wherein the remote control system is further provided with a vibration detection device to provide the warning signal to the remote control device when the remote control device is vibrated a predetermined amount from a substantially stable position;

the vibration detection device provides the warning signal for a predetermined amount of time before the remote control system enters into a fault condition;

the fault condition avoidable by a cancellation of the warning signal by a user of the remote control device or repositioning the remote control device in the substantially stable position.

10. The remote control system of claim 1 wherein the remote control system is further provided with an impact detection device to prove the warning signal to the remote control device when the remote control device is impacted above a predetermined impact level.

11. The remote control system of claim 10 wherein the impact detection device further provides a second warning signal to the remote control device when the remote control device is impacted above a second predetermined impact level; the impact detection device providing the second warning signal to the remote control device for a predetermined amount of time before the remote control system enters into a default condition, the fault condition avoidable by a cancellation of the warning signal by a user of the remote control device.

12. The remote control system of claim 1 wherein the remote control system further comprises a second controller module connected to the railway vehicle, the second controller module monitoring a second set of predetermined functions and receiving commands from the remote control device to control the second set of predetermined functions of the railway vehicle.

13. The remote control system of claim 12 wherein the set of predetermined functions and the second set of predetermined functions are selected from the group consisting of pressure of the fluid in a main reservoir, pressure of a fluid in an independent brake, pressure of a fluid in a train brake, the throttle, the braking system, and combinations thereof.

* * * * *